US009207520B2

(12) United States Patent
Hagino et al.

(10) Patent No.: US 9,207,520 B2
(45) Date of Patent: Dec. 8, 2015

(54) PROJECTOR APPARATUS HAVING A FOLDABLE FILTER DEVICE

(75) Inventors: Noriyuki Hagino, Shizuoka (JP); Yoshihisa Wada, Shizuoka (JP); Kazuhiro Takai, Aichi (JP)

(73) Assignee: SONY CORPORATION, Tokyo (JP)

( * ) Notice: Subject to any disclaimer, the term of this patent is extended or adjusted under 35 U.S.C. 154(b) by 663 days.

(21) Appl. No.: 12/932,077

(22) Filed: Feb. 17, 2011

(65) Prior Publication Data

US 2011/0211170 A1 Sep. 1, 2011

(30) Foreign Application Priority Data

Feb. 26, 2010 (JP) ................................ P2010-041999

(51) Int. Cl.
*G03B 21/16* (2006.01)
*G03B 21/14* (2006.01)
*B01D 46/10* (2006.01)

(52) U.S. Cl.
CPC ............... *G03B 21/14* (2013.01); *G03B 21/16* (2013.01); *B01D 46/10* (2013.01)

(58) Field of Classification Search
CPC ........ G03B 21/16; G03B 21/18; G03B 21/14; G03B 21/20; B01D 46/10; B01D 46/12; B01D 46/2403; H04N 9/3144
USPC ............... 353/119, 59, 60, 52, 61, 55, 56, 58; 348/744, 748; 362/218, 373; 55/311, 55/318, 320, 307, 341.2; 95/68; 96/338; 361/691, 690, 688
See application file for complete search history.

(56) References Cited

U.S. PATENT DOCUMENTS

| | | | |
|---|---|---|---|
| 2,087,096 A * | 7/1937 | Safford | 525/444 |
| 4,758,460 A * | 7/1988 | Spicer et al. | 428/159 |
| 5,059,218 A * | 10/1991 | Pick | 96/66 |
| 6,402,324 B1 | 6/2002 | Kuroda et al. | |
| 6,533,835 B2 * | 3/2003 | Wilson et al. | 55/481 |
| 7,018,048 B2 | 3/2006 | Ito et al. | |
| 7,850,310 B2 * | 12/2010 | Nagahata et al. | 353/57 |
| 7,997,736 B2 * | 8/2011 | Yoshimura et al. | 353/52 |
| 8,021,454 B2 * | 9/2011 | Braunecker et al. | 55/483 |
| 8,317,337 B2 * | 11/2012 | Watanabe | 353/61 |
| 2009/0320426 A1 | 12/2009 | Braunecker et al. | |

FOREIGN PATENT DOCUMENTS

| | | | | |
|---|---|---|---|---|
| JP | 60-066329 | | 11/1986 | |
| JP | 7013528 | | 3/1995 | |
| JP | 8089729 | | 4/1996 | |
| JP | 09315142 A | * | 12/1997 | ............... B60H 3/06 |

(Continued)

OTHER PUBLICATIONS

Office Action from Japanese Application No. 2010-041999, dated Oct. 22, 2013.

(Continued)

*Primary Examiner* — Que T Le
*Assistant Examiner* — Jennifer Bennett
(74) *Attorney, Agent, or Firm* — Hazuki International, LLC

(57) ABSTRACT

A filter device which may include first and second filter elements allowing air to pass therethrough, and first and second filter holding members holding the first and second filter elements such that they are linearly connected side by side. The holding members being connected to be foldable in the position where the filter elements are connected.

6 Claims, 7 Drawing Sheets

(56) References Cited

FOREIGN PATENT DOCUMENTS

| | | |
|---|---|---|
| JP | 10-186513 A | 7/1998 |
| JP | 2000-010191 A | 1/2000 |
| JP | 2003024729 A | 1/2003 |
| JP | 2003-121941 A | 4/2003 |
| JP | 2004-205713 A | 7/2004 |
| JP | 2004210286 A | 7/2004 |
| JP | 4020119 B2 | 12/2007 |
| JP | 2008071538 A | 3/2008 |
| JP | 2009003317 * | 1/2009 |
| JP | 2009003317 A | 1/2009 |
| JP | 2010017630 A | 1/2010 |
| WO | 2009156910 A2 | 12/2009 |

OTHER PUBLICATIONS

Office Action from Japanese Application No. 2010-041999, dated Mar. 4, 2014.

Office Action from Chinese Application No. 2011-10040926.X, dated Apr. 30, 2014.

* cited by examiner

FILTER MEMBER IN FOLDED STATE

PROJECTOR APPARATUS HAVING A FOLDABLE FILTER DEVICE

CROSS-REFERENCE TO RELATED APPLICATION

The present application claims priority from Japanese Patent Application No. JP 2010-041999 filed in the Japanese Patent Office on Feb. 26, 2010, the entire content of which is incorporated herein by reference.

BACKGROUND OF THE INVENTION

1. Field of the Invention

The present invention relates to a filter device and a projector apparatus having such a filter device. More particularly, the invention relates to a filter device required for taking in external air and to a technique used in a projector apparatus having such a filter device.

2. Description of the Related Art

An electronic apparatus according to the related art such as projector apparatus for projecting images have a cooling mechanism for suppressing heat generated at internal processing sections as a result of operations of the apparatus by taking external air into the apparatus to cool the same.

When an apparatus takes in cooling air, the external air is sent to a filter to remove particles of dust in the same, and the air is thereafter taken into the apparatus. Particles of dust are removed from air with a filter as thus described to prevent the entry of particles of dust which can adversely affect the apparatus.

A filter of the type described above must receive maintenance such as cleaning or replacement each time the apparatus employing the filter is operated to a certain degree, and the filter is therefore constructed such that it can be inserted and removed in and from the apparatus.

Mechanisms for inserting and removing a filter in and from a projector apparatus according to the related art include relatively simple mechanisms formed by an external air intake port and a filter covering the same, a frame-like element formed by the external air intake port and the filter holding the same serving as an inserting/removing mechanism.

There are alternative mechanisms in which a frame member holding a filter is slid into an apparatus from a side of the body of the apparatus and in which the filter is disposed in the middle of a duct provided in the apparatus for taking external air into the apparatus. When such a mechanism is used in a projector apparatus, there is no need for disposing a filter at an external air intake port which is visible on the exterior of the apparatus. Therefore, the mechanism allows the filter to be inserted and removed in and from the apparatus while allowing the apparatus designed with relatively good appearance.

JP-A-10-186513 (Patent Document 1) discloses an exemplary projector apparatus in which a filter 241 is disposed to be attachable to an air intake port as shown in FIG. 3 accompanying the document.

SUMMARY OF THE INVENTION

In order to improve the efficiency of cooling utilizing external air in the above-described type of apparatus, it is required to increase the size of an eternal air intake port and to increase the surface area of a filter. However, when an excessively large filter is used, the problem of degradation of operability arises when the filter is inserted and removed in and from an apparatus. The use of a large filter is preferable in that the filter is less likely to undergo clogging and the cycle of cleaning of the filter can be extended. However, measures must be taken to dispose a large filter properly.

For example, in the case of the above-described mechanism in which a frame member holding a filter is slid into an apparatus from a side of the body of the apparatus to house the filter inside the apparatus, if the filter has a great size in the longitudinal direction thereof, the filter can hit a wall and the like when it is pulled out from the apparatus. Projector apparatus are mostly fixed to a predetermined location in a room, e.g., the ceiling of the room when they are used. In the case of a projector apparatus fixed along a wall, a filter pulled out from the apparatus for the purpose of maintenance may interfere with the wall, and the replacement of the filter may be disabled in some cases. Therefore, the apparatus must be installed at such a distance from the wall that filter replacement can be carried out. However, when a filter of a greater size is used, the distance at which the apparatus must be spaced from the wall to allow filter replacement increases accordingly, which has been problematic in that there are increased limitations on the installation of the apparatus.

Under the circumstance, it is desirable to reduce limitations placed on the replacement of a filter for taking external air into an apparatus.

According to an embodiment of the invention, there is provided a filter device to be used in an apparatus having an intake port for taking external air into the body of the apparatus.

The filter device includes first and second filter elements allowing air taken in through the intake port to pass therethrough and first and second filter holding members holding the first and second filter elements such that they are linearly connected side by side, the holding members being connected to be foldable in the position where the filter elements are connected.

A projector constituting the apparatus body has a filter insertion hole through which the first and second filter holding members are slid in the direction of the linear alignment between them. Thus, the filter holding members can be contained in the apparatus body.

In such a configuration, when the first and second filter holding members are inserted through the filter insertion hole, one of the filter holding member can be inserted with the other filter holding member folded. It is therefore possible to insert and remove the filters in and from the apparatus for the replace and cleaning of the filters if a space having a length equal to or greater than the length of one filter holding member is available beside the apparatus body.

According to the embodiment of the invention, one of the filter holding member can be inserted with the other filter holding member folded. The filters can be replaced or cleaned if a space having a length equal to or greater than the length of one filter holding member is available beside the apparatus body. Therefore, the space required for the installation of an apparatus body can be smaller than that in the related art, and limitations placed on a space where an apparatus body is to be installed are relaxed compared to limitations placed according to the related art.

DESCRIPTION OF PREFERRED EMBODIMENTS

Embodiments of the invention will now be described. The following items will be described in the order listed.

1. Overall Configuration of Projector Apparatus (FIGS. 1 to 3)
2. Configuration of Filter (FIGS. 6 and 7)
3. Flow of Air taken through Air Intake Port (FIGS. 4 and 5)
4. Modifications

[1. Overall Configuration of Projector Apparatus]

Figure 1:
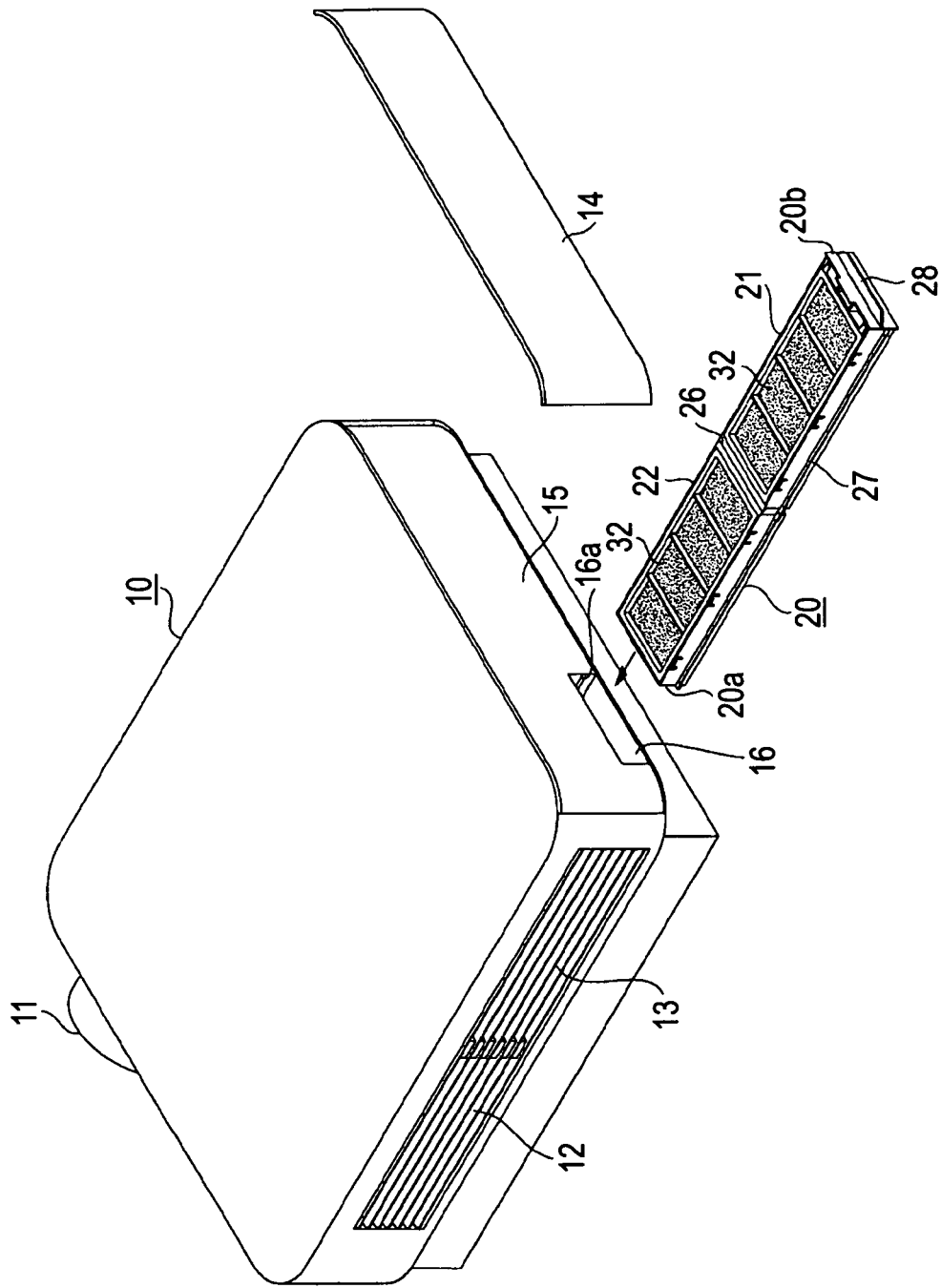
FIG. 1 is a perspective view of a projector apparatus according to an embodiment of the invention showing an exemplary general configuration thereof.

FIG. 1 is an illustration showing an overall configuration of a projector apparatus according to an embodiment of the invention.

The present embodiment is a projector apparatus which displays an image as follows. An optical block provided in the apparatus irradiates a display panel with light from a light source. Image light (projection light) of an image to be displayed formed by transmitting or reflecting the light from the light source at the display panel is projected on a screen through a projection lens to display the image.

As shown in FIG. 1, a projection lens 11 is mounted on a front end of the body of a projector apparatus 10, the body being formed by a box-like housing. Projection light exits the projection lens 11.

FIG. 1 shows one side face and a rear end of the projector apparatus 10. Two air intake ports 12 and 13 are disposed on the side face such that they extend side by side in the horizontal direction. Air taken through the air intake ports 12 and 13 blows on an optical block in the projector apparatus 10 as a cooling air flow. The intake air is passed through filters 31 and 32 mounted to a filter member 20 as shown in FIG. 1 (the filter 31 is not shown in FIG. 1), although details of the configuration for passing the intake air will be described later. The filter member 20 is shown outside the apparatus in FIG. 1.

The filter member 20 of the present embodiment has an elongate shape, and the member is formed by connecting two filter holding portions, i.e., a first filter holding portion and a second filter holding portion 22 into a straight shape at a connecting portion 26. One of the filter holding portions can be folded toward the other filter holding portion at the connecting portion 26. A specific configuration of the filter member 26 will be described later.

A cover 14 is mounted to a rear end 15 of the body of the projector apparatus 10. The cover 14 is shown apart from the apparatus body in FIG. 1. As shown in FIG. 1, a filter insertion hole 16 is exposed by removing the cover 14. The filter member 20 formed by connecting two filter holding portions into a straight shape is linearly inserted into the filter insertion hole 16 from one end 20a thereof. When the filter member 20 has been completely inserted into the filter insertion hole 16, another end 20b of the filter member 20 is exposed at the filter insertion hole 16. A grip portion 28 is provided at the end 20b, and a maintenance worker can remove the filter member 20 by pulling out the filter member 20 with the grip portion 28 held by his or her fingers.

Figure 2:
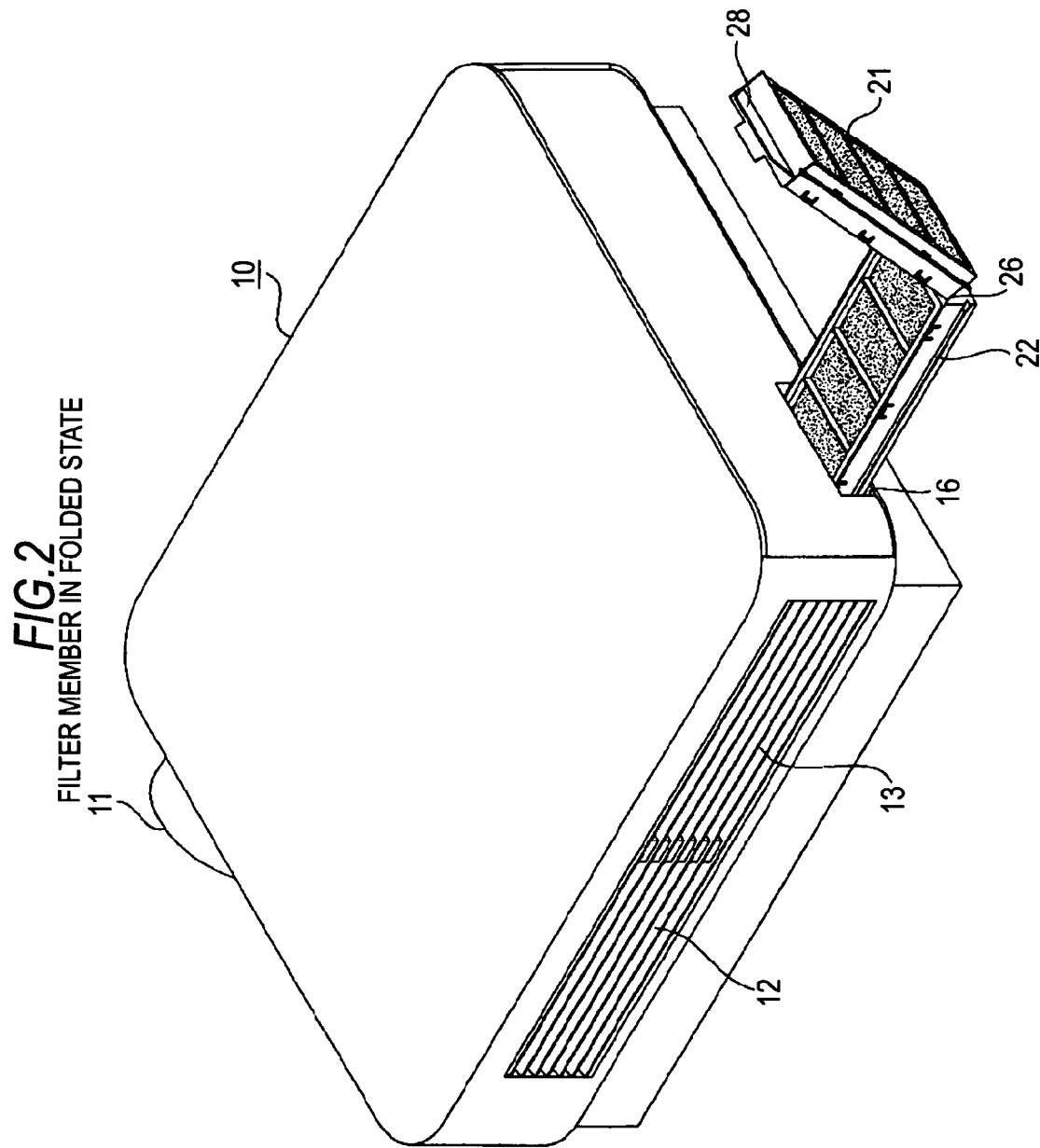
FIG. 2 is a perspective view of the projector apparatus according to the embodiment of the invention showing a filter member partially inserted therein.

FIG. 2 shows a state in which the filter member 20 has been inserted into the filter insertion hole 16 halfway (the second filter holding portion 22 has been inserted halfway).

As shown in FIG. 2, when only the second filter holding portion 22 is inserted with the first filter holding portion 21 kept outside the filter insertion hole 16, the first filter holding portion 21 can be folded upward about the connecting portion 16 serving as a fulcrum.

Figure 3:
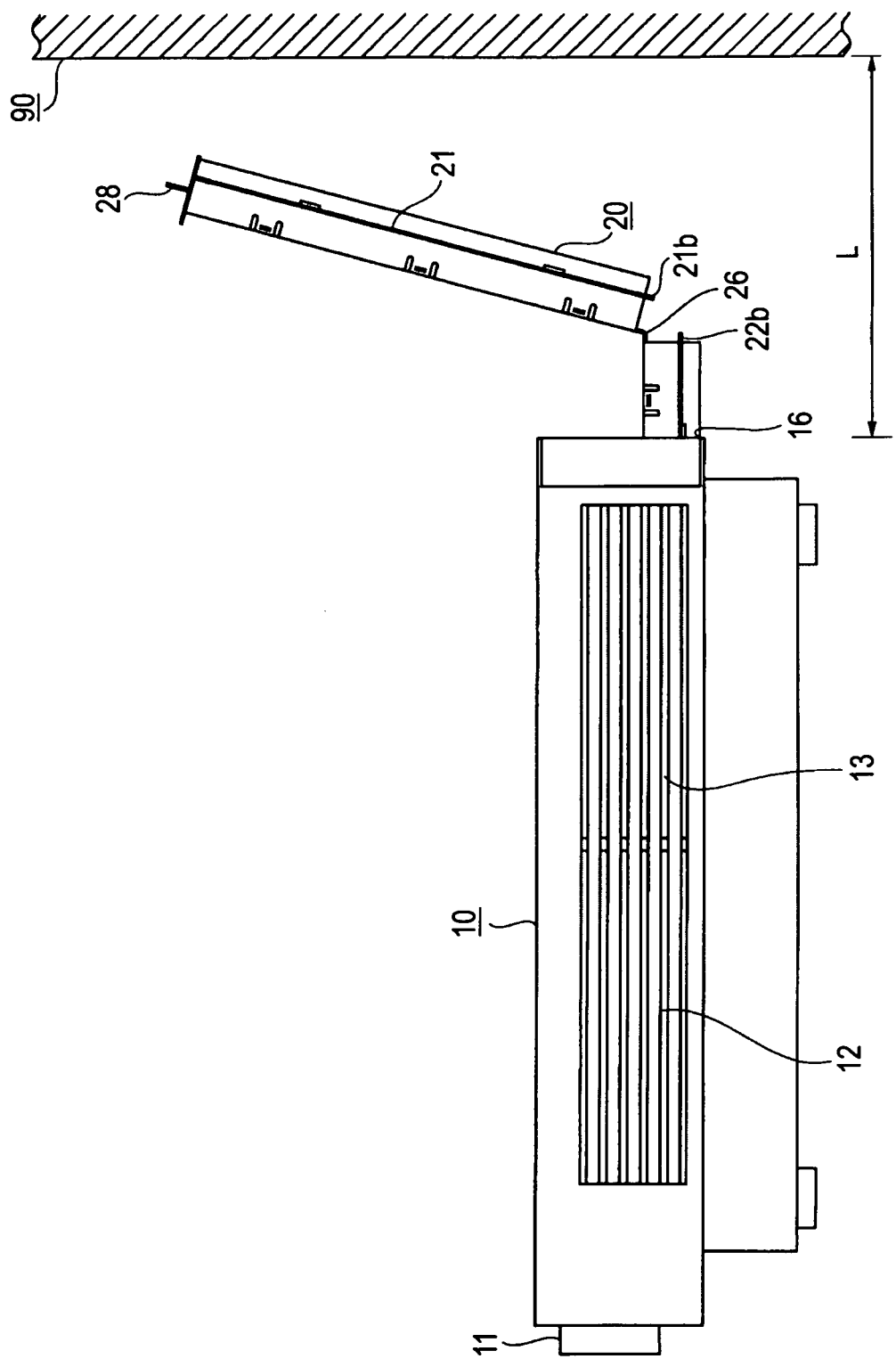
FIG. 3 is a side view of the projector apparatus according to the embodiment of the invention in the state shown in FIG. 2.

FIG. 3 is a side view of the apparatus in the same state as shown in FIG. 2, and FIG. 3 shows a state in which the first filter holding portion 21 is folded and lifted upward.

Therefore, as shown in FIG. 3 the filter member 20 can be replaced with new one when a distance L from the rear end 15 of the projector apparatus 10 to a wall 90 exceeds half of the length of the filter member 20 (or the length of each of the filter holding portions 21 and 22) even in a small amount.

[2. Configuration of Filter]

An exemplary configuration of the filter member 20 of the present embodiment will now be described with reference to FIGS. 6 and 7.

Figure 6:
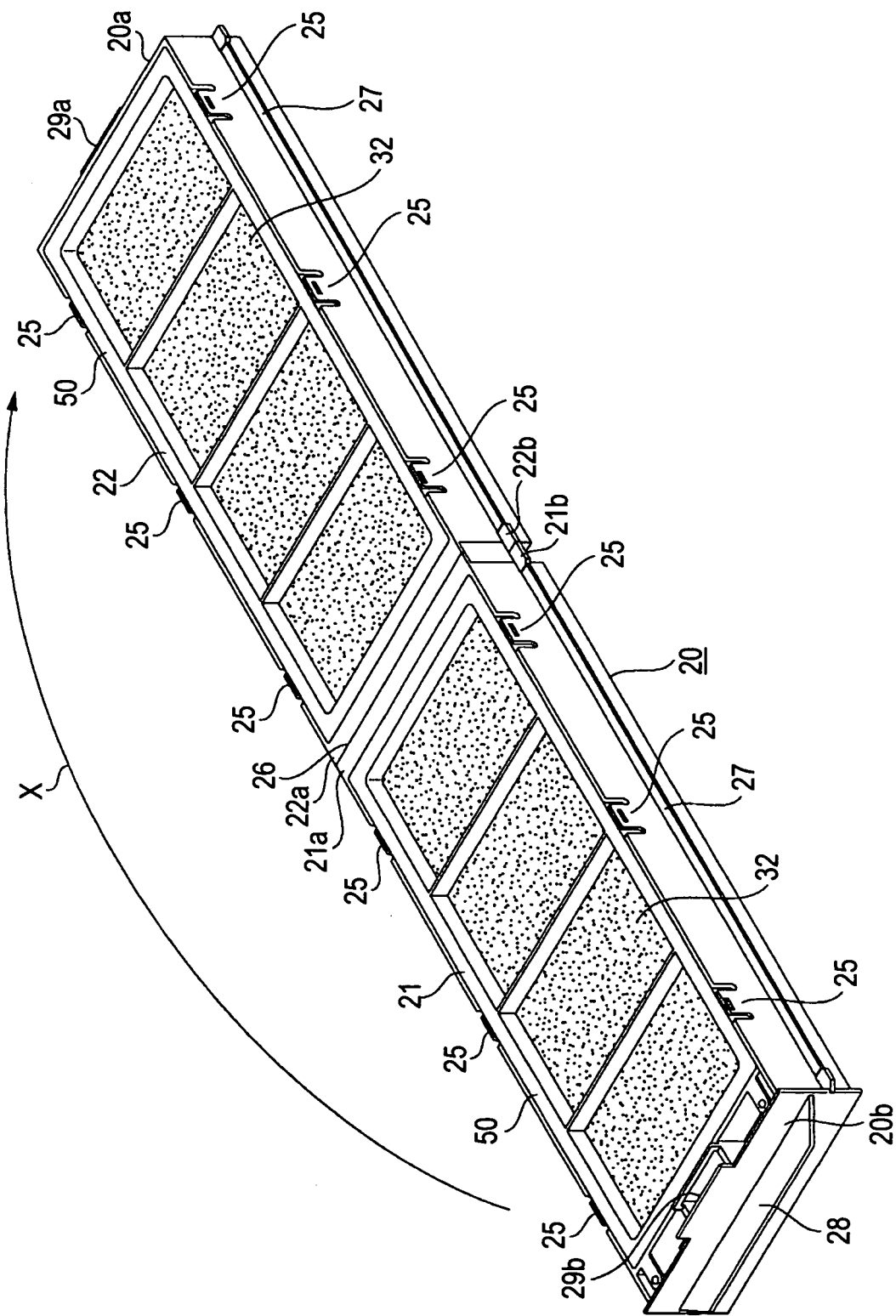
FIG. 6 is a perspective view of a filter member according to the embodiment of the invention showing an exemplary configuration thereof.
Figure 7:
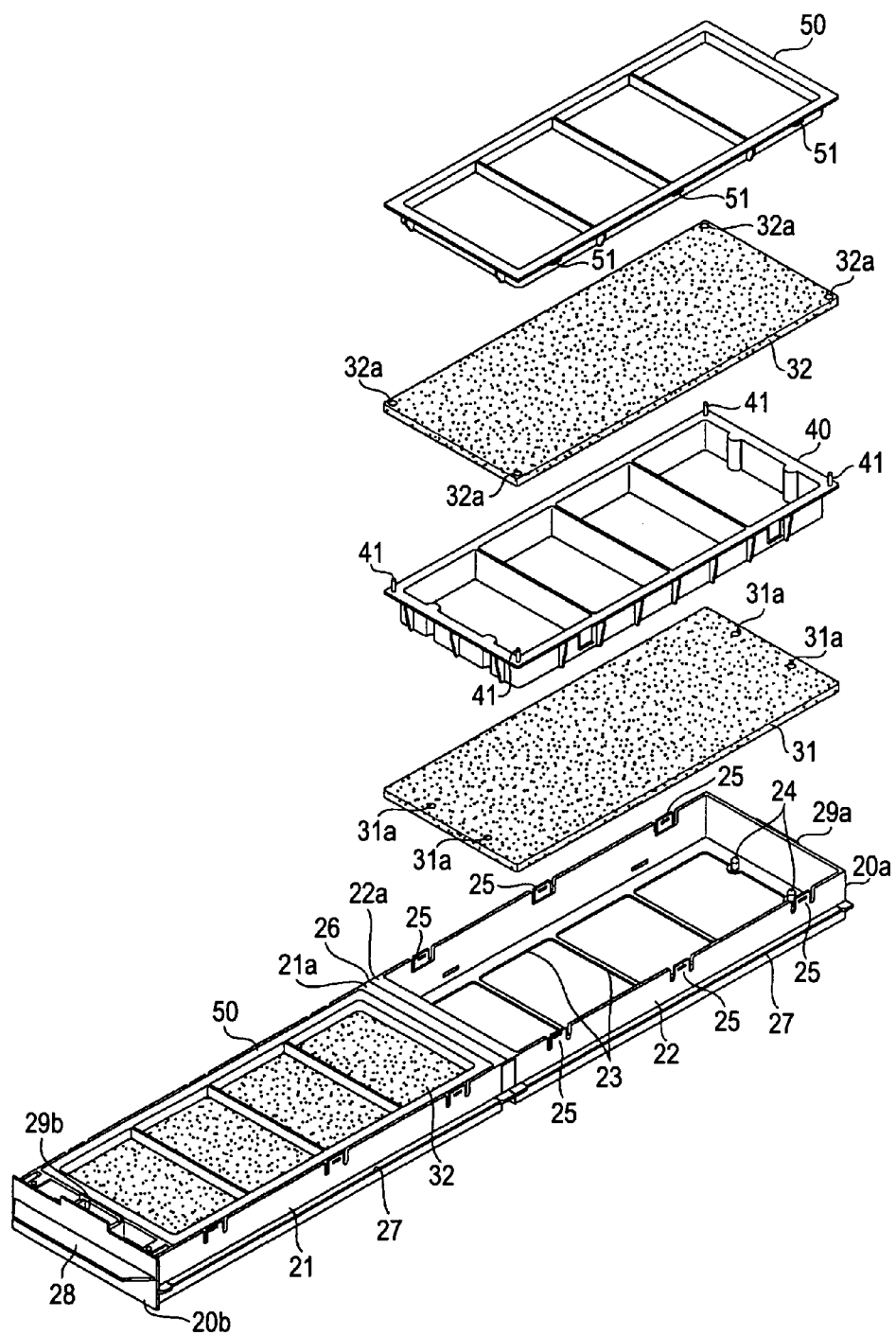
FIG. 7 is a partially exploded perspective view of the filter member shown in FIG. 6.

FIG. 6 is a general perspective view of the filter member 20, and FIG. 7 shows an exploded view of the second filter holding portion 22 with the first filter holding portion 21 shown in an assembled state. The first filter holding portion 21 and the second filter holding portion 22 have the same configuration for holding the filter, the configuration being shown in the exploded view of the second filter holding portion 22 in FIG. 7.

As shown in FIG. 6, the filter member 20 is formed by connecting the first filter holding portion 21 and the second filter holding portion 22 at a connecting portion 26 such that holding portions are integrated to extend straightly, each of the holding portions being formed from a resin. The connecting portion 26 is a bendable and rotatable connecting portion, as described above. Specifically, as shown in FIG. 6, the connecting portion 26 is formed by connecting an end 21a of the top surface of the first filter holding portion 21 with an end 22a of the top surface of the second filter holding portion 22 using a resin film having a thickness smaller than the thickness of the regions of the holding portions surrounding the same. Since the connecting portion 26 has a small thickness as thus described, the first filter holding portion 21 and the second filter holding portion 22 can be folded toward each other.

For example, as indicated by the arrow X in FIG. 6, the filter member 20 can be folded such that one end 20b of the filter member 20 is put in contact with another end 20a of the same.

When the filter member is folded such that the top surface of the first filter holding portion 21 is put into contact with the top surface of the second filter holding portion 22, an engaging part 29a provided at the end 20a engages an engaging part 29b provided at the other end 20b to keep the member in the folded state. That is, the engaging parts 29a and 29b serves as anchoring mechanism parts for holding the first filter holding portion 21 and the second filter holding portion 22 in a lapped state.

When a filter member 20 is transported to be mounted to an apparatus or to be used as a replacement for maintenance, the member can be transported in such a folded state. The elongate filter member 20 can be transported with its length shortened as thus described.

When the first filter holding portion 21 and the second filter holding portion 22 are arranged in the straight state as shown in FIG. 6, an end of a protrusion 21b of the first filter holding portion 21 and an end of a protrusion 22b of the second filter holding portion 22 abut on each other in a position lower than the connecting portion 26. The abutment between the ends of the protrusions 21b and 22b regulates the first filter holding portion 21 and the second filter holding portion 22 to prevent the holding portions from being folded in the opposite directions. Specifically, although the first filter holding portion 21 can be folded or lifted upward as indicated by the arrow X, the first filter holding portion 21 can not be folded downward.

Ribs 27 are provided on both lateral surfaces of each of the first filter holding portion 21 and the second filter holding portion 22 of the filter member 20. FIGS. 6 and 7 show the ribs 27 provided on one side of the filter holding portions with the ribs on the other side omitted.

When the filter member 20 is inserted into a filter insertion hole 16 as shown in FIG. 1, the ribs 27 fit in grooves 16a provided on the duct section 70 as will be described later to allow the filter member 20 to be slid linearly.

The mechanism of the first filter holding portion 21 and the second filter holding portion 22 for holding filters 31 and 32 will now be described with reference to FIG. 7. As described above, the first filter holding portion 21 and the second filter holding portion 22 hold the filters 31 and 32 using the same configuration. The disposition of a filter in the second filter holding portion 22 will now be described with reference to FIG. 7, and the description completely applies to the first filter holding portion 21.

As shown in FIG. 7, a holding frame 23 is provided at the bottom of a frame made of resin which constitutes the second filter holding portion 22, and the filter 31 is supported by the holding frame 23 at a bottom surface thereof.

The filter 31, which is constituted by a sponge-like resin sheet or nonwoven fabric, is placed on the holding frame 23.

The filter 31 has holes 31a provided in four positions near edges thereof, and protrusions 24 provided on the holding frame 23 in four inward positions thereof (only two locations are shown) are inserted into the holes 31a of the filter 31 to secure the filter 31 in place.

A frame-like spacer 40 constituted by a resin member is disposed on the filter 31, and the filter 32 is disposed on the spacer 40. The filter 32 is also constituted by a sponge-like resin sheet or nonwoven fabric, but the filter 31 is formed from a material having finer pores through which are is allowed to pass when compared to the filter 32.

The filter 32 also has holes 32a provided at four corners thereof, and protrusions 41 provided at four corners of the spacer 40 are inserted into the holes 32a of the filter 32 to secure the filter 32 in place.

Further, a presser member 50 is placed on the filter 32 to press the top surface of the filter 32. The presser member 50 has three protrusions 51 provided in three positions on each side thereof, and the protrusions 51 are engaged with respective anchoring parts 25 provided in six locations on side faces of the body of the second filter holding portion 22 to secure the presser member 50, whereby the filters 31 and 32 are secured in place.

Two filters 31 and 32 are disposed in each of the first filter holding portion 21 and the second filter holding portion 22 such that the filters are spaced from each other at a predetermined interval. Thus, particles of dust included in air taken from the outside are removed by the four filters in total.

[3. The flow of Air from Intake Ports]

The flow of air taken in through the air intake ports 12 and 13 shown in FIG. 1 will now be described with reference to FIGS. 4 and 5.

Figure 4:
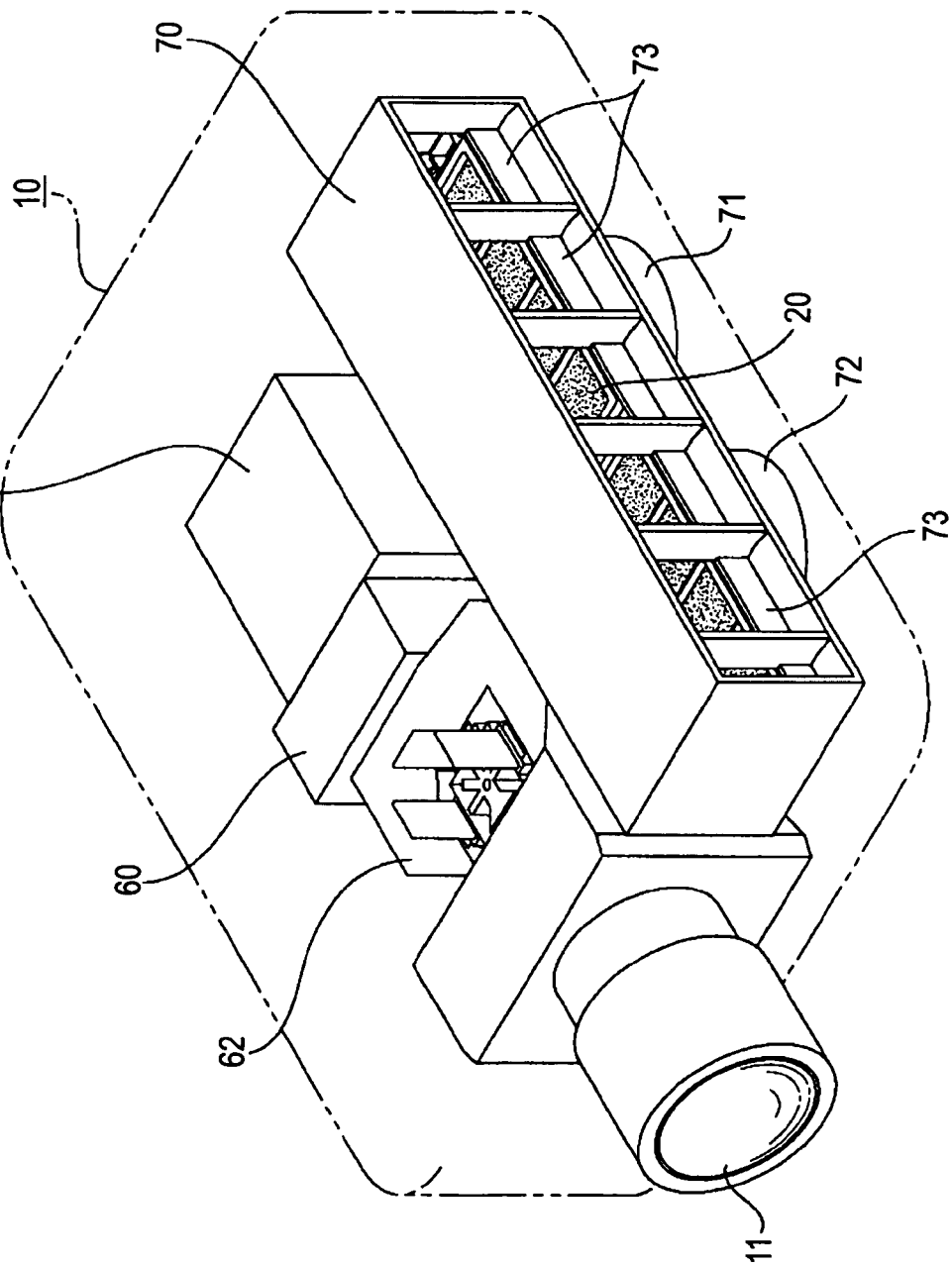
FIG. 4 is a perspective view of the projector apparatus according to the embodiment of the invention showing an exemplary internal configuration thereof.

FIG. 4 is an illustration showing the external shape of the optical block 60 in the projector apparatus 10 and showing a duct section 70 disposed beside the optical block 60. The external shape of the projector apparatus 10 (the shape of the housing) is represented by an imaginary line (two-dot chain line). A filter member 20 is horizontally disposed in the duct section 70 shown in FIG. 4. FIG. 5 shows the configuration of the apparatus with the duct section 70 omitted (to show the filter member 20).

As shown in FIG. 4, the duct section 70 has a plurality of openings 73 provided in series on a side of the same associated with the position where the air intake ports 12 and 13 show in FIG. 1 are disposed, and the filter member 20 is disposed at the bottom of the duct section 70.

Further, two Scirocco fans 71 and 72 are disposed under the filter member 20 to cause air filtered through the filter member 20 to blow on the bottom of the optical block 60 disposed adjacent to the duct section. The two Scirocco fans 71 and 72 blow external air on a part of the optical block 60 where a display panel section 62 is disposed, i.e., a heat-generating part of the optical block 60 to cool the part. In the present embodiment, three display panels are disposed to form the display panel section 62, and the two Scirocco fans and 72 supply air to the three display panels in cooperation with each other. Air is also supplied from the Scirocco fans 71 and 72 to a light source section 61, which is another heat-generating part of the optical block 60, to cool the section.

Figure 5:
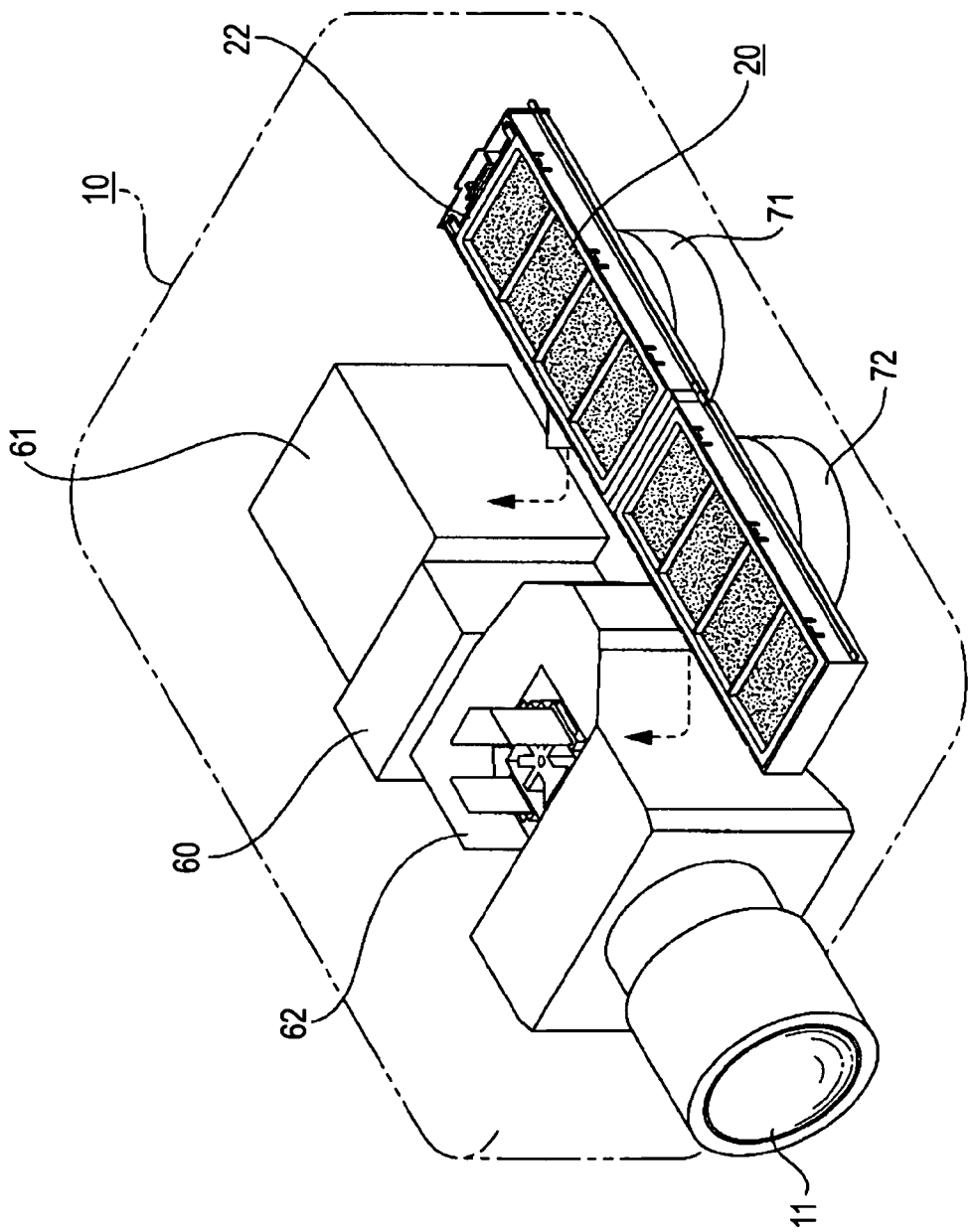
FIG. 5 is a perspective view of the projector apparatus according to the embodiment of the invention showing the exemplary internal configuration thereof.

As will be apparent from the disposition of the filter member 20 illustrated in FIG. 5, the two Scirocco fans 71 and 72 are disposed directly under the filter member 20. Therefore, external air taken in through the openings 73 of the duct section 70 (or the air intake ports 12 and 13) reaches the Scirocco fans 71 and 72 after passing through the four filters 31 and 32 of the filter member 20. Thus, the air is supplied to the Scirocco fans 71 and 72 with particles of dust removed from the same.

As described above, in the projector apparatus 10 of the present embodiment, filters having a relatively large surface area are disposed as filter for cleaning cooling air, whereby a filter member 20 extending substantially the entire length of the side face of the apparatus is formed. Operations of mounting and removing the filter member 20 in and from the apparatus can be carried out in a small space.

Specifically, since the filter member 20 can be folded in the middle thereof as shown in FIGS. 2 and 3, the filter member can be replaced with new one even when a wall 90 exists near the rear end of the apparatus if a distance L that is substantially equivalent to one half of the length of the filter member 20 is left between the apparatus and the wall.

The use of large filters allows cleaning and maintenance operations to be carried out at longer intervals, and the space required around the projector apparatus 10 to perform such operations can be small. Thus, the embodiment is advantageous in that limitations placed on a space for installing the main body of the projector apparatus can be relaxed when compared to the related art.

The first filter holding portion 21 and the second filter holding portion 22 of the filter member 20 are made foldable toward each other by a simple resin feature having a small thickness connecting the holding portions 21 and 22. Therefore, the connecting portion can be formed at the same time when the holding portions 21 and 22 are molded from a resin.

This is advantageous in that the connecting portion for allowing the filter member to be folded can be formed simply at a low cost.

When the filter member 20 is transported to be mounted to an apparatus or to be used as a replacement for maintenance, the member can be folded to halve the length thereof as indicated by the arrow X in FIG. 6. Thus, the elongate filter member 20 can be transported with its length shortened as thus described, and the transportation of the filter member 20 can be carried out with improved operability.

Further, since the filter member 20 is constructed so as to be easily locked in the folded state by the engaging portions 29a and 29b, particles of dust deposited on the filters 31 and 32 can be confined in the filter member. It is therefore possible to prevent particles of dust from scattering when the filter member 20 is removed from the projector apparatus 10 for transportation.

The two filters 31 and 32 held by the holding portions 21 and 22 of the foldable filter member 20 are disposed at an interval from each other, and the material of the filters 31 and 32 are different in coarseness. Large particles of dust are removed when eternal air first passes through the filter 32, and smaller particles of dust are thereafter removed by the finer filter 31. Thus, the embodiment is advantageous in that the air filters are capable of cleaning air with very high efficiency. In addition, since the filter member 20 including the two filters 31 and 32 having a relatively great surface area can be folded compactly as thus described, the filter member can be efficiently operated.

[4. Modifications]

While the above-described embodiment is an application of the invention to a filter for cleaning cooling air for a projector apparatus which projects images, the invention may be applied to other types of electronic apparatus which must take external air into themselves.

FIG. 1 and other figures merely show an exemplary position of the insertion hole at which the filter member is inserted into the body of an apparatus such as a projector apparatus and exemplary positions of air intake ports, The configuration in which each of the filter holding portions 21 and 22 holds two filters 31 and 32 is also merely an example. Each filter holding portion may alternatively be configured such that only one filter is disposed therein.

Although the filter member 20 of the present embodiment is configured to be folded halfway at one folding position, two or more folding positions may alternatively be provided.

It should be understood by those skilled in the art that various modifications, combinations, sub-combinations and alterations may occur depending on design requirements and other factors insofar as they are within the scope of the appended claims or the equivalents thereof.

What is claimed is:

1. A projector apparatus comprising:
an air intake port taking external air into a body portion of the apparatus;
first and second filter assemblies allowing the air taken in through the air intake port to pass therethrough;
first and second filter holding members holding the first and second filter assemblies so as to be linearly connected side by side, the first and second filter holding members being connected to be foldable in a predetermined direction at a position where the filter assemblies are connected together, wherein an end of a protrusion on a lateral surface of the first filter holding member abuts an end of a protrusion on a lateral surface of the second filter holding member in a position lower than the position where the filter assemblies are connected together such that the abutment prevents the first filter holding member and the second filter holding member to be foldable in a direction other than the predetermined direction;
an optical block cooled by external air delivered thereto after being taken in through the intake port and passed through the first and second filter assemblies; and
a filter insertion hole through which the first and second filter holding members are insertable in a direction of linear alignment therebetween so as to place the holding members in the body portion of the apparatus,
wherein each of the first and second filter assemblies held by the first and second filter holding members includes a respective first filter and a respective second filter so as to provide four filters, the respective first filter and second filter of each of the first and second filter assemblies are arranged so as to be parallel to each other and spaced apart from each other at a predetermined interval such that the air taken in through the intake port passes through the four filters before being delivered to the optical block,
wherein the projector apparatus has a front side having a projection lens through which projection light exits and a rear side which is opposite the front side,
wherein the filter insertion hole is located on the rear side of the projector apparatus, and
wherein a first engaging part provided on the first filter holding member is engaged to a second engaging part provided on the second filter holding member so as to hold the first filter holding member and the second filter holding member in a state in which the holding members are lapped as a result of folding at the connecting position.

2. The projector apparatus according to claim 1, wherein a resin member forming part of the first and second filter holding members is reduced in thickness in the region where the first filter holding member and the second filter holding member are connected, the resin member serving as a feature for connecting the filter holding members in a foldable manner.

3. The projector apparatus according to claim 1, wherein the first engaging part and the second engaging part form an anchoring mechanism part holding the first filter holding member and the second filter holding member in the state in which the holding members are lapped as a result of folding at the connecting position.

4. The projector apparatus according to claim 1, wherein size of pores of the respective first filter of each of the first and second filter assemblies is smaller than size of pores of the respective second filter of each of the first and second filter assemblies.

5. The projector apparatus according to claim 1, wherein the respective second filter of each of the first and second filter assemblies is present at the predetermined interval above the respective first filter of each of the first and second filter assemblies.

6. The projector apparatus according to claim 1, wherein a plurality of ribs are provided on the lateral surfaces of the first and second filter holding members such that the plurality of ribs are fitted into corresponding grooves of a duct section of the apparatus when the first and second filter holding members are inserted in the body portion of the apparatus.

* * * * *